US008625553B2

(12) United States Patent  
Henry

(10) Patent No.: US 8,625,553 B2
(45) Date of Patent: Jan. 7, 2014

(54) METHOD AND APPARATUS FOR PROVIDING COMMUNICATION OVER A WHITE SPACE CHANNEL WITHOUT CAUSING INTERFERENCE

(75) Inventor: Paul Shala Henry, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 534 days.

(21) Appl. No.: 12/620,120

(22) Filed: Nov. 17, 2009

(65) Prior Publication Data

US 2011/0116484 A1    May 19, 2011

(51) Int. Cl.
H04Q 7/24 (2006.01)

(52) U.S. Cl.
USPC .......................................... 370/338

(58) Field of Classification Search
None
See application file for complete search history.

(56) References Cited

U.S. PATENT DOCUMENTS

| | | | |
|---|---|---|---|
| 5,873,041 A | 2/1999 | Ishil | |
| 6,088,361 A * | 7/2000 | Hughes et al. | 370/439 |
| 6,201,499 B1 | 3/2001 | Hawkes et al. | |
| 6,292,665 B1 | 9/2001 | Hildebrand et al. | |
| 7,495,608 B1 | 2/2009 | Chen et al. | |
| 8,416,134 B2 | 4/2013 | Henry et al. | |
| 2003/0078075 A1* | 4/2003 | McNicol | 455/562 |
| 2003/0119525 A1 | 6/2003 | Rajkotia | |
| 2004/0127226 A1 | 7/2004 | Dugad et al. | |
| 2005/0030228 A1 | 2/2005 | Judd | |
| 2005/0195103 A1 | 9/2005 | Davis et al. | |
| 2006/0109514 A1* | 5/2006 | Klassen | 358/3.26 |
| 2008/0046978 A1 | 2/2008 | Rieger | |
| 2008/0088507 A1 | 4/2008 | Smith et al. | |
| 2009/0042581 A1 | 2/2009 | Liu et al. | |
| 2009/0047916 A1* | 2/2009 | Haykin | 455/115.1 |
| 2009/0091494 A1 | 4/2009 | Sugimoto et al. | |
| 2009/0117859 A1* | 5/2009 | Smith et al. | 455/78 |
| 2009/0215457 A1 | 8/2009 | Wang et al. | |
| 2009/0238107 A1* | 9/2009 | Li et al. | 370/312 |
| 2010/0075704 A1* | 3/2010 | McHenry et al. | 455/509 |

(Continued)

FOREIGN PATENT DOCUMENTS

| | | |
|---|---|---|
| GB | 2422064 | 7/2006 |
| WO | WO 9939517 | 8/1999 |
| WO | WO 2009/045646 A2 | 4/2009 |

OTHER PUBLICATIONS

PCT Search Report and Written Opinion for PCT/US2010/053330, Jan. 18, 2011, 11 unnumbered pages.

(Continued)

Primary Examiner — Hassan Phillips
Assistant Examiner — Prenell Jones

(57) ABSTRACT

A method and an apparatus for providing communication over a white space channel without causing interference are disclosed. The method generates a first request to identify at least one available white space channel, and applies a spreading sequence to the first request to generate a second request. The method applies a modulation to the second request to generate a third request in the time domain, and transmits the third request via a wireless communication to at least one other user. Alternatively, the method receives a request wirelessly, wherein the request comprises a request for availability of at least one white space channel, and applies a demodulation on the request to generate a demodulated request. The method applies a spreading sequence on the demodulated request to generate a de-spread request, and processes the de-spread request by determining availability of at least one white space channel.

20 Claims, 5 Drawing Sheets

(56) References Cited

U.S. PATENT DOCUMENTS

| | | | |
|---|---|---|---|
| 2010/0123626 A1 | 5/2010 | Yano | |
| 2010/0124254 A1* | 5/2010 | Wu et al. | 375/131 |
| 2010/0238898 A1 | 9/2010 | Chin et al. | |
| 2010/0255794 A1* | 10/2010 | Agnew | 455/77 |
| 2010/0271263 A1 | 10/2010 | Moshfeghi | |
| 2011/0096770 A1 | 4/2011 | Henry et al. | |
| 2011/0103317 A1* | 5/2011 | Ribeiro et al. | 370/329 |
| 2011/0122855 A1 | 5/2011 | Henry et al. | |
| 2011/0149778 A1* | 6/2011 | Yu | 370/252 |
| 2011/0170559 A1 | 7/2011 | Zhang et al. | |
| 2012/0096498 A1* | 4/2012 | Wu et al. | 725/81 |
| 2013/0178229 A1 | 7/2013 | Henry et al. | |

OTHER PUBLICATIONS

PCT Search Report and Written Opinion for PCT/US2010/056995, Jan. 18, 2011, 11 unnumbered pages.

PCT Search Report and Written Opinion for PCT/US2010/053339, Feb. 4, 2011, 13 unnumbered pages.

Stevenson, C. et al., "IEEE 802.22: The first cognitive radio wireless regional area network standard", IEEE Communications Magazine, IEEE Service Center, Piscataway, U.S., vol. 44, No. 1., Jan. 1, 2009, pp. 130-138.

Stevenson, C, et al., "IEEE P802.22/Draftv1.0 Draft Standard for Wireless Regional Area Networks Part 22:Cognitive Wireless RAN Medium Access Control (MAC) and Physical Layer (PHY) specifications: Policies and procedures for operation in the TV Bands", IEEE, Pistcataway, NJ, USA, Jan. 1, 2006, pp. 1-426.

Yuan, Y, et al., "KNOWS: Cognitive Radio Networks Over White Spaces", New Frontiers in Dynamic Spectrum Access Networks, 2007, DYSPAN 2007, 2nd IEEE International Symposium On, IEEE, PI, Apr. 1, 2007, pp. 416-427.

Xiaohua, L, et al., "A Frequency Hopping Spread Spectrum Transmission Scheme for Uncoordinated Cognitive Radios", Acoustics, Speech and Signal Processing, 2009, ICASSP 2009, IEEE International Conference On, IEEE, Piscataway, NJ, USA, Apr. 19, 2009, pp. 2345-2348.

Cordeiro, C, et al., "IEEE 602.22: An Introduction to the First Wireless Standard based on Cognitive Radios," Internet Citation, Apr. 2006, pp. 3B-47, URL: http://www.academypublisher.com/icm/vol01/no1/icm01013847.pdf [retreived on Jul. 8, 2008].

Do-Hyun Na, et al., "Policy-based Dynamic Channel Selection Architecture for Cognitive Radio Networks,"Communications and Networking in China, 2007, CHINACOM '07, Second International Conference On, IEEE, Piscataway, NJ, USA, Aug. 22, 2007, pp. 1190-1194.

"TV-Positioning", 3 pages, Rosum Corporation, 2004.

A.J. Van Dierendonck, GPS Receivers, in Global Positioning System: Theory and Applications, vol. 1, ed. B.W. Parkinson et al. p. 337-340 1996.

Rosum, "TV-Positioning", http://wwww.rosum.com/rosum_technology_tv-positioninq.html, [downloaded on Nov. 20, 2009].

Rosum, "About", http://wwww.rosum.com/rosum_about.html, [downloaded on Nov. 20, 2009].

Rosum, "Technology", http://wwww.rosum.com/rosum_technology.html, [downloaded on Nov. 20, 2009].

* cited by examiner

METHOD AND APPARATUS FOR PROVIDING COMMUNICATION OVER A WHITE SPACE CHANNEL WITHOUT CAUSING INTERFERENCE

The present disclosure relates generally to communication networks and, more particularly, to a method and apparatus for providing communication over a white space channel without causing interference, e.g., interference with other television broadcast channels.

BACKGROUND

A user may wish to use a frequency that is unlicensed for broadcast television for communication, for a wireless local area network (LAN) or for communication with other users. For example, the user may wish to use a white space channel (e.g., an unused channel in the spectrum that is allocated for television broadcasting), for communication. However, two or more devices may autonomously select the same white space channel from among a plurality of available white space channels. This will create interference between various users of such white space channels, e.g., if these users want to use the available white space channels for their own purposes such as operating a wireless LAN by each user.

Additionally, if two or more devices actually want to communicate with each other via a white space channel, another problem arises where the two or more devices actually communicate with each other before they can be certain that they have found a vacant white space channel. One approach is to implement an initial negotiation between the various devices for the purpose of identifying an available white space channel. Unfortunately, the signals transmitted for the initial negotiation for the purpose of identifying a white space channel available may cause interference with television broadcasts. For example, if a channel is un-licensed at a first location of a first device, but is a licensed channel at the second location of a second device, then when the first device operating under the assumption that the channel is unlicensed, uses the channel to communicate with the second device, the transmitted signal will potentially cause interference with a television broadcast at the second location of the second device.

SUMMARY

In one embodiment, the present disclosure describes a method and an apparatus for providing communication over a white space channel without causing interference. For example, the method generates a first request to identify at least one available white space channel, and applies a spreading sequence to the first request to generate a second request. The method applies a modulation to the second request to generate a third request in the time domain, and then transmits the third request via a wireless communication to at least one other user.

In an alternate embodiment, the method receives a request wirelessly, wherein the request comprises a request for availability of at least one white space channel, and applies a demodulation on the request to generate a demodulated request. The method applies a spreading sequence on the demodulated request to generate a de-spread request, and processes the de-spread request by determining availability of at least one white space channel.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly describes a method and apparatus for providing communication over a white space channel without causing interference. Although the present disclosure is discussed below in the context of white space networks communicating with IP networks, e.g., Internet Protocol (IP) Multimedia Subsystem (IMS) networks, the present disclosure is not so limited. Namely, the present disclosure can be applied to packet networks in general, e.g., Voice over Internet Protocol (VoIP) networks, Service over Internet Protocol (SoIP) networks, and the like. More broadly, this disclosure refers to white space networks communicating over any type of networks that allow connection with a geo-location database as further described below.

Figure 1:
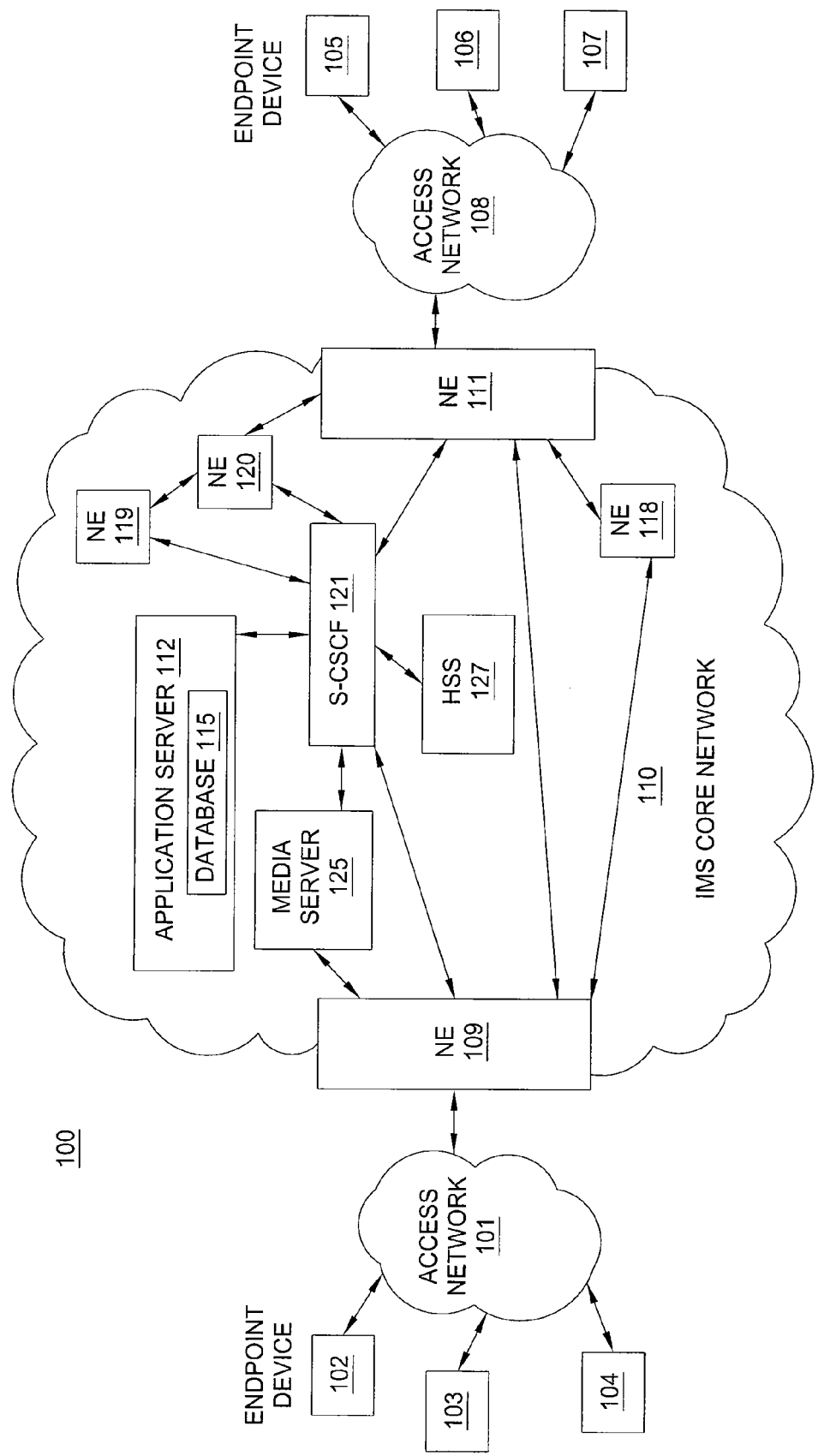
FIG. 1 illustrates an exemplary network related to the present disclosure.

To better understand the present disclosure, FIG. 1 illustrates an example network 100, e.g., an Internet Protocol (IP) Multimedia Subsystem network related to the present disclosure. An IP network is broadly defined as a network that uses Internet Protocol to exchange data packets. Exemplary IP Multimedia Subsystem (IMS) networks include Internet protocol (IP) networks such as Voice over Internet Protocol (VoIP) networks, Service over Internet Protocol (SoIP) networks, and the like.

In one embodiment, the network 100 may comprise a plurality of endpoint devices 102-104 configured for communication with the core IMS network 110 (e.g., an IP based core backbone network supported by a service provider) via an access network 101. Similarly, a plurality of endpoint devices 105-107 are configured for communication with the IMS core packet network 110 via an access network 108. The network elements 109 and 111 may serve as gateway servers or edge routers for the network 110.

The endpoint devices 102-107 may comprise customer endpoint devices such as personal computers, laptop computers, Personal Digital Assistants (PDAs), mobile phones, smart phones, and the like. The access networks 101 and 108 serve as a conduit to establish a connection between the endpoint devices 102-107 and the Network Elements (NEs) 109 and 111 of the IMS core network 110. The access networks 101 and 108 may each comprise a Digital Subscriber Line (DSL) network, a broadband cable access network, a Local Area Network (LAN), a Wireless Access Network (WAN), a $3^{rd}$ party network, a cellular network, and the like. The access networks 101 and 108 may be either directly connected to NEs 109 and 111 of the IMS core network 110, or indirectly through another network.

Some NEs (e.g., NEs 109 and 111) reside at the edge of the IMS core infrastructure and interface with customer endpoints over various types of access networks. An NE that resides at the edge of a core infrastructure is typically implemented as an edge router, a media gateway, a proxy server, a border element, a firewall, a switch, and the like. An NE may also reside within the network (e.g., NEs 118-120) and may be used as a SIP server, an application server, a core router, or like device.

The IMS core network 110 also comprises a Home Subscriber Server (HSS) 127, a Serving-Call Session Control Function (S-CSCF) 121, a Media Server (MS) 125, and an Application Server 112 that contains a database 115. The S-CSCF of the calling party and the S-CSCF of the called party are also referred to as the originating S-CSCF and the terminating S-CSCF, respectively. An HSS 127 refers to a network element residing in the control plane of the IMS network that acts as a central repository of all customer specific authorizations, service profiles, preferences, etc.

The S-CSCF 121 resides within the IMS core infrastructure and is connected to various network elements (e.g., NEs 109 and 111) using the Session Initiation Protocol (SIP) over the underlying IMS based core backbone network 110. The S-CSCF 121 may be implemented to register users and to provide various services (e.g., VoIP services). The S-CSCF interacts with the appropriate VoIP/SoIP service related applications servers (e.g., 112) when necessary. The S-CSCF 121 performs routing and maintains session timers. The S-CSCF may also interrogate an HSS to retrieve authorization, service information, user profiles, etc. In order to complete a call that requires certain service specific features, the S-CSCF may need to interact with various application servers (e.g., various VoIP servers). For example, the S-CSCF may need to interact with another server for translation of an E.164 voice network address into an IP address, and so on.

The Media Server (MS) 125 is an application server that typically handles and terminates media streams to provide services such as announcements, bridges, and Interactive Voice Response (IVR) messages for VoIP service applications. The media server also interacts with customers for media session management to accomplish tasks such as process requests.

The application server 112 may comprise any server or computer that is well known in the art, and the database 115 may be any type of electronic collection of data that is also well known in the art. It should be noted that the communication system 100 may be expanded by including additional endpoint devices, access networks, network elements, application servers, etc. without altering the scope of the present disclosure. The above IP network is only described to provide an illustrative environment in which packets for voice, data, and multimedia services are transmitted on networks.

The United States Federal Communications Commission (FCC) has released unused portions of the spectrum in the frequency range of 54 MHz-698 MHz, which were previously reserved for television broadcasts, for use without a license. A channel that allows unlicensed use in this frequency range is referred to as a white space channel. A user may wish to use a channel in the unlicensed spectrum for communication within a local area network of the user. For example, a user may want to use the white space channel in a local area network that interconnects a plurality of networked devices throughout the home of the user. In another example, a user may want to use the white space channel to communicate with other users, e.g., friends, neighbors, coworkers, and so on. The white space channels are attractive for communication because the transmitted signals travel long distances and are able to penetrate structures, e.g., walls in buildings and so on. However, in order to prevent interference with licensed channels, e.g., television broadcasts, in the same spectrum, and other users who are also interested in using the available white space channels, spectrum sensing technology can be employed.

Sensing technology refers to a method that enables a device to determine if there is transmission on a particular channel at a particular time. The spectrum sensing method enables the device to identify available channels at a specific time. Once the available channels are identified, the device makes a selection of a channel from among the channels identified as being available. However, by the time the device starts transmitting on the selected channel, the channel may suddenly become unavailable. For example, each of a plurality of devices may run its own spectrum sensing method and identify a channel as being available. As a result, it is possible that the plurality of devices may actually select the same channel, thereby resulting in interference. In another example, spectrum sensing may be performed during a period of inactivity by a licensed user such a broadcasting television station temporarily off the air. That is, the channel may in-fact be licensed, but appears to a device to be an unlicensed white space channel. When the activity by the licensed user resumes, interference may occur.

One approach is to implement an initial negotiation between the various devices for the purpose of identifying an available white space channel. Unfortunately, the signals transmitted for the initial negotiation for the purpose of identifying a white space channel available may cause interference with television broadcasts as discussed above.

In one embodiment, the current method enables a network service provider (or a third party) to provide its customers a method and an apparatus to initiate communication over a white space channel without causing interference. For example, a plurality of customers of the service provider may each implement a White Space Local Area Network (WS-LAN). The customers may then wish to communicate with each other over a white space channel, or to identify an available white space channel for local usage such as using the white space channel in a WSLAN. Each customer may then implement a WSLAN to communicate via a white space channel, wherein each of the WSLANs comprises at least one device with a spectrum sensing technology. For example, a WSLAN may deploy a WSLAN gateway that has the ability to determine a list of white space channels that are available (unused) at a location at a specific time. The current method enables the WSLAN gateways for the plurality of WSLANs to initiate communication over a white space channel, wherein the initiation of communication is performed without causing interference with users of television channels, and the like.

In one embodiment, the current method enables a network device, e.g., a WSLAN gateway, to apply a spread spectrum technique to data at a transmitting device, wherein the spread spectrum technique is applied to convert the data into a rapidly fluctuating noise like waveform spread across a wider bandwidth as compared to the bandwidth of the data itself. The spread spectrum technique applies a spreading sequence to a received data to obtain a rapidly fluctuating waveform. The resulting rapidly fluctuating noise like waveform has a lower power spectral density. The waveform with the lower power spectral density causes less interference to other signals.

In one embodiment, the data to be spread may be received from a user endpoint device. For example, a WSLAN gateway may receive the data from another user endpoint device and then apply a spreading sequence to the received data. In another embodiment, the WSLAN gateway itself may generate the data (e.g., based on a need to use a white space channel), and then apply the spread spectrum technique to the generated data.

The resulting waveform is then modulated resulting in a time domain signal that is transmitted to other users via a wireless path. In one embodiment, the spread spectrum technique is applied to a system that utilizes a frequency domain modulation technique, e.g., a Frequency Division Multiplex (FDM) such as Orthogonal Frequency Division Multiplex (OFDM), and the like. For example, at a transmitter device or system, a spreading sequence is applied by a spreader module to a received data stream and the resultant is then provided to an OFDM transmitter. The OFDM transmitter converts the rapidly fluctuating waveform to a high-frequency signal for subsequent transmission over a wireless path.

In turn, at a receiver device or system, an OFDM receiver may then demodulate a received waveform, and provide the resulting waveform to a despreader module that applies a de-spreading. For example, a WSLAN gateway may apply the same spreading sequence that was applied on the transmitter. For successful communication between a transmitting device and a receiving device, the same spreading (or de-spreading) sequence is used on both devices. For brevity, the spreading/de-spreading sequence is simply referred to as a spreading sequence.

In one embodiment, the above spread spectrum technique can be applied by a plurality of OFDM users, using different spreading sequences, to communicate with one another without causing interference to television broadcasts or other OFDM users. For example, a first group of users may wish to communicate using a first spreader sequence. Whereas, a second group of users may wish to communicate using a second spreader sequence. The signals from the first group may then be transmitted without causing interference to television broadcasts or to the second group of OFDM users. Similarly, the signals from the second group may be transmitted without causing interference to television broadcasts or to the first group of OFDM users.

In one embodiment, a spreader sequence may be configured in a device when a device is being activated. For example, when a customer obtains a device that may be used as a gateway for a WSLAN, the customer may be asked to provide or select a group of other customers with whom the customer wishes to communicate. A spreader sequence may then be selected and configured in accordance with the information received from the customer when the device is activated.

In one embodiment, a group of users who intend to communicate with each other may notify a service provider or a third party that the devices are to implement the same spreader sequence. The service provider may then instantiate a spreader sequence to enable communication among the group of users, e.g., a group of users of different WSLANs.

In one embodiment, the spreader sequence may be provided in a local registry, e.g., a locally maintained database, or a network-based registry, e.g., a database that is maintained by a network service provider at a network service provider's network. For example, a group of neighbors may share a spreader sequence, and another user wishing to be added to the group may then have his/her device instantiated with the same spreader sequence that was obtained by gaining access to the locally maintained database, e.g., maintained by one of the member of the group, or by gaining access to the network-based database, e.g., maintained by the network service provider.

In one embodiment, the current method enables WSLAN gateways to cooperatively identify an available white space channel by communicating with each other using a spread spectrum technique applied in the frequency domain. The spread spectrum technique enables the gateways to negotiate and identify an appropriate white space channel, without causing interference with television channels or other systems. For example, the data generated for negotiating a white space channel may have a low data rate. The spread spectrum sequence may then be applied to the data resulting in a rapidly fluctuating waveform spread across a much wider bandwidth. The rapidly fluctuating waveform may then be transmitted via an OFDM system. At the receiver location, an OFDM module in a receiver demodulates the waveform and the spreader sequence is applied. If there is no packet loss, the output from applying the spreader sequence is the data that was generated and transmitted at a low data rate. It should be noted that packet loss or packet corruption may occur for various reasons. In such situations, known error correction techniques can be applied to the original data.

Figure 2:
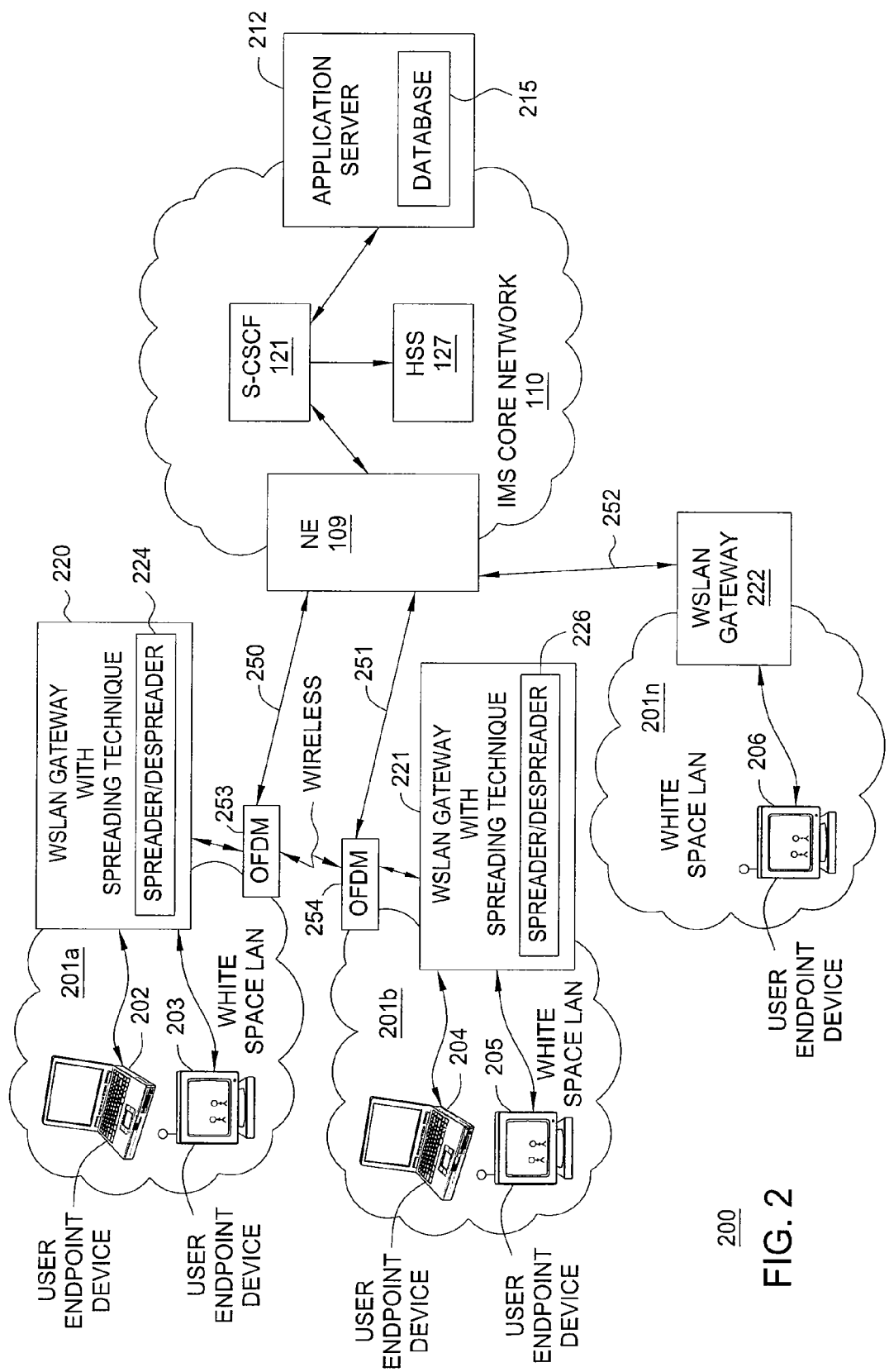
FIG. 2 illustrates an exemplary network in accordance with one embodiment of the current disclosure for providing communication over a white space channel without causing interference.

FIG. 2 illustrates an exemplary network 200 in accordance with one embodiment of the current disclosure for providing communication over a white space channel without causing interference. In one embodiment, the network 200 comprises User Endpoint (UE) devices 202-206 communicating with an IMS network 110 to access network services, through a white space LAN 201a, 201b, or 201n.

The white space LAN 201a comprises UE devices 202 and 203 and WSLAN gateway 220. The UE devices 202 and 203 communicate with the IMS network 110 via the WSLAN gateway 220 and NE 109. In one embodiment, the WSLAN gateway 220 is in communication with an OFDM module or system 253 for conversion of signals from frequency domain to time domain and vice versa. The OFDM module or system 253 comprises a transceiver for communication with another OFDM module or system, e.g., 254, via a wireless path. In one embodiment, an UE or the WSLAN gateway from the WSLAN 201a may forward data to the OFDM module or system 253, where the OFDM module or system 253 will modulate the data before it is transmitted in the time domain. Similarly, data received by the OFDM module or system 253 (data traveling towards the UE or WSLAN gateway) is demodulated and converted back to the frequency domain prior to being forwarded to the WSLAN gateway 220.

Similarly, the white space LAN 201b comprises UE devices 204 and 205 and WSLAN gateway 221. The UE devices 204 and 205 communicate with the IMS network 110 via the WSLAN gateway 221 and NE 109. In one embodiment, the WSLAN gateway 221 is in communication with an OFDM module or system 254 for conversion of signals from frequency domain to time domain and vice versa. The OFDM module or system 254 comprises a transceiver for communication with another OFDM module or system, e.g., 253, via a wireless path. In one embodiment, an UE or the WSLAN gateway from the WSLAN 201b may forward data to the OFDM module or system 254, where the OFDM module or system 254 will modulate the data before it is transmitted in a time domain. Similarly, data received by the OFDM module or system 254 (data traveling towards the UE or WSLAN gateway) is demodulated and de-spread prior to being forwarded to the WSLAN gateway 221. It should be noted that although the OFDM module or system 253 and 254 are illustrated as a separate module or system, it can in fact be implemented as a part of the WSLAN gateway 220 or 221 or a part of an UE within the WSLAN 201a or 201b.

The white space LAN 201*n* comprises UE device 206 and WSLAN gateway 222. The UE device 206 communicates with the IMS network 110 via the WSLAN gateway 222 and NE 109.

It should be noted that although the WSLAN gateway 220 is illustrated as a separate module in FIG. 2, the present disclosure is not so limited. In other words, the WSLAN gateway need not be physically distinct from the UE devices. In WSLAN 201*a*, for example, the gateway could be a program running on the computer 203 and so on.

For illustration, the IMS core network comprises an NE 109, an S-CSCF 121, HSS 127, an application server 212 and a database 215. It should be noted that the IMS network 110 and the white space LANs may comprise any number of other network devices. For clarity reasons, the present disclosure only includes those components that are used to describe the various embodiments as discussed above.

It should also be noted that the WSLANs 201*a*, 201*b* and 201*n* may communicate with the IMS 110 via a variety of communications media and different network elements that reside at the edge of the IMS core network. For example, communication links 250, 251 and 252 may be wireless network based, wire based, etc.

In one embodiment, a plurality of customers of a network service provider may wish to communicate with each other over a white space channel. For example, a customer with an endpoint device 202 and a customer with an endpoint device 204 may wish to communicate with each other over a white space channel. The WSLAN gateway 220 serving the user endpoint device 202 and the WSLAN gateway 221 serving the user endpoint device 204 may then need to cooperatively identify a white space channel that is available at both locations. In one embodiment, the service provider of network 110 can assist the plurality of customers to properly select a white space channel for communication as a service, e.g., a service that can be subscribed by a customer. For example, the service provider will assist in the providing of a spreading sequence to a plurality of customers, where it is used to determine an available white space channel.

Broadly, the "customer" is to be interpreted to include an owner of the WSLAN. As such, in one embodiment, it is the owner of the WSLAN gateway who would subscribe to the channel-sharing service, rather than the separate owners or users of the UE devices. Furthermore, a customer is broadly interpreted to at least one service, e.g., provided by a network service provider. Furthermore, the term "user" is broadly interpreted to include customers and/or "non-customers", where non-customers are not subscribers of at least one service, e.g., provided by a network service provider.

To illustrate, a spreading sequence is provided to the WSLAN gateways 220 and 221. For example, in order to identify which white space channels are available at all the desired locations, the WSLANs may each use a sensing technology at their respective locations. For example, a sensing technology may be implemented in the WSLAN gateways 220 and 221. The WSLAN gateways 220 and 221 may then exchange the information gathered via sensing technology for their respective locations by transmitting the information using a spread spectrum technique. Importantly, the spread spectrum technique enables the WSLAN gateways 220 and 221 to exchange information and cooperatively identify an appropriate white space channel without causing interference to any television broadcasts or other spread spectrum users, e.g., UE 206, WSLAN 222, etc.

In one embodiment, the spreader sequence is in the WSLAN gateways 220 and 221 provisioned when the gateways are activated. For example, a network service provider may instantiate a spreader sequence based on a customer's profile. For example, a customer may subscribe for a white space channel acquisition service, where at such time, a customer profile is established. For example, the customer may provide a list of other customers or a group of users with whom the customer wishes to communicate via a white space channel. The service provider may store the customer profiles in the HSS 127. The service provider may then use profiles of a plurality of customers to identify the relevant spreader sequence(s) and instantiate the identified sequence(s) in the respective customer's gateway device.

In one embodiment, the spreader sequence may be provided via a registry, e.g., a phone book, a database, etc. For example, users of white space channels may register their spreader sequences in a database, e.g., in a database 215 via an application server 212. In one embodiment, a customer during activation of a gateway may communicate with the application server 212 to select a particular spreader sequence. For example, the customer may select the same spreader sequence being used by family, friends, neighbors, etc. More broadly, a customer might be provided with several sequences, to be used (e.g., one at a time) for communicating with different groups of users. The application server 212 may query the database to retrieve the spreading sequences that are being used by the family, friends, neighbors, etc. from the database 215. A list of one or more spreading sequences may then be presented to the customer. The customer may then select a specific spreading sequence to be instantiated in the customer's WSLAN gateway device for a particular communication session. The service provider may then instantiate the selected spreading sequence. In one alternate embodiment, the database can be locally implemented at a networked device of the customer.

Once a spreading sequence is applied by a WSLAN gateway, the data is converted to time domain via an OFDM module or system and transmitted wirelessly. For example, the WSLAN gateway 220 applies a spreading sequence via a spreader/despreader module 224 and forwards the resulting data to the OFDM module or system 253. The OFDM module or system 253 modulates the data and converts the data to the time domain, where it is transmitted wirelessly. The OFDM module or system 254 receives the data, where it is demodulated and converted back to the frequency domain and then provided to the WSLAN gateway 221. The WSLAN gateway 221 may then apply the spreading sequence to recover the original data.

It should be noted that although the above illustrative example shows the OFDM modules or systems as two standalone devices, the above example should not be interpreted as a limitation to the present disclosure. For example, the OFDM modules or systems and the spreader/de-spreader module can be implemented in the same gateway device. That is, the OFDM module or system 253 and spreader/de-spreader module 224 can be both implemented in the WSLAN gateway 220, and the OFDM module or system 254 and spreader/de-spreader module 226 can be both implemented in the WSLAN gateway 221.

Figure 3:
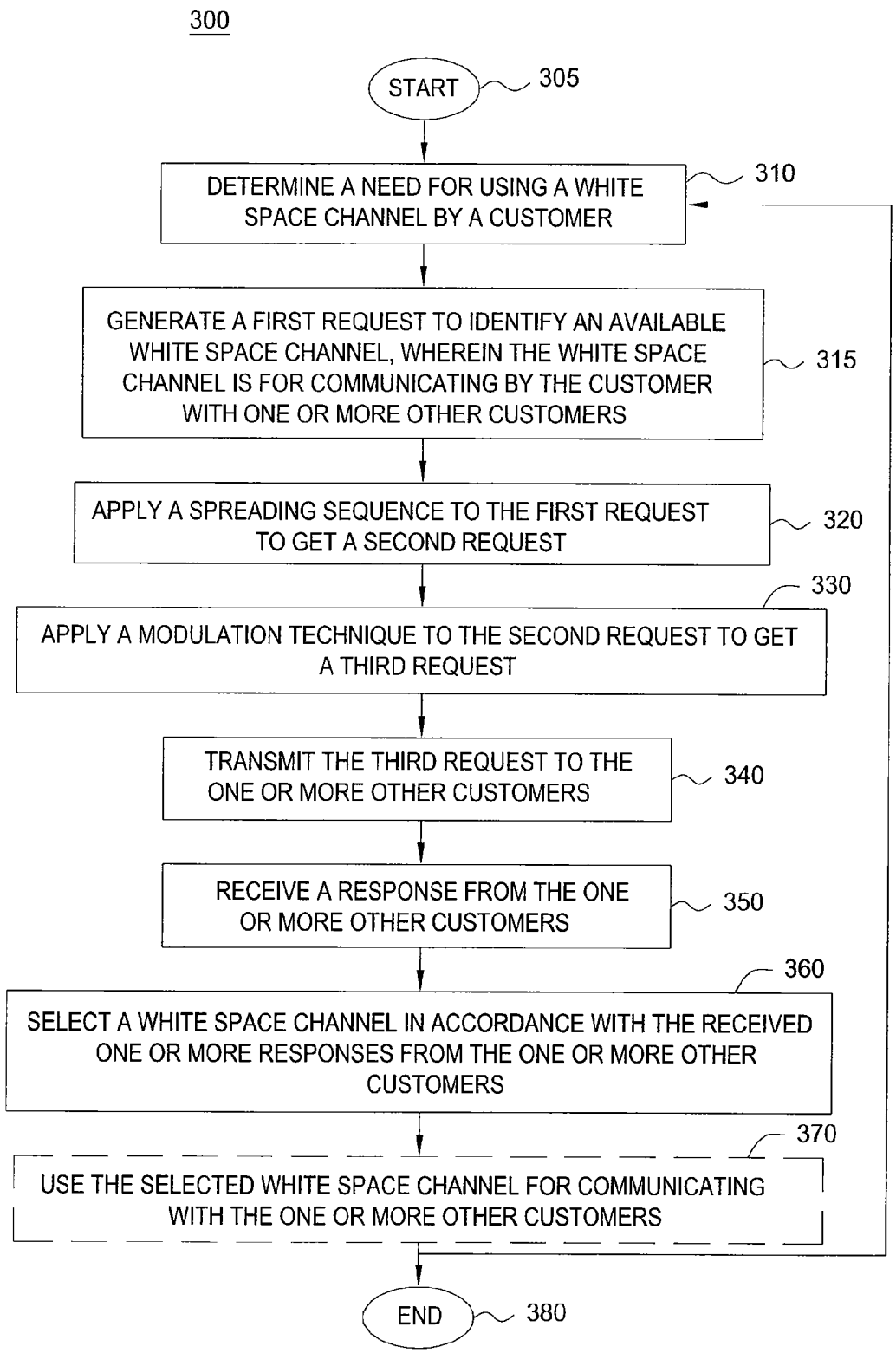
FIG. 3 illustrates a flowchart of a method for initiating communication over a white space channel without causing interference.

FIG. 3 illustrates a flowchart of a method 300 for initiating communication over a white space channel without causing interference. In one embodiment, the method can be implemented in a WSLAN device, e.g., a WSLAN gateway device or a user endpoint device. For example, a frequency spreading technique can be implemented in a WSLAN device with a spreading sequence as described above. Method 300 starts in step 305 and proceeds to step 310.

In step 310, method 300 determines or detects a need for using a white space channel by a customer. For example, a White Space Local Area Network (WSLAN) gateway may receive a first request for a white space channel from a user endpoint device of the customer. For example, the user endpoint device may send a request for a white space channel to the device serving as the WSLAN gateway device for the customer. In another example, the WSLAN gateway itself needs to use a white space channel.

In step 315, method 300 generates a first request to identify an available white space channel, wherein the white space channel is for communicating by the customer with one or more other customers. For example, the first request may be a query to solicit one or more responses from the one or more other customers regarding availability of white space channels at their respective locations.

In step 320, method 300 applies a spreading sequence to the first request to obtain a second request. For example, the method may apply the spreading sequence to the first request such that the resulting second request is a high bandwidth signal that will not cause interference.

In step 330, method 300 applies a modulation technique to the second request to obtain a third request, wherein the third request is in the time domain. In one embodiment, the modulation technique comprises a Frequency Division Multiplexing (FDM) technique such as Orthogonal Frequency Division Multiplexing (OFDM) technique.

In step 340, method 300 transmits the third request to the one or more other customers. For example, the method may wirelessly transmit to a plurality of WSLAN gateways serving the one or more other customers with whom the customer wishes to initiate communication over an available white space channel.

The OFDM modules or systems at the sites of the one or more other customers receive the third request, perform demodulation and forward the resulting requests to their respective WSLAN gateways. The WSLAN gateways of the other customers apply the spreading sequence to retrieve the first request. The one or more other WSLAN gateways may then process the request and send a response in accordance with their respective knowledge of the available white space channels. For example, each of the one or more other gateways may have spectrum sensing to identify which of the white space channels are available at their respective locations.

In step 350, method 300 receives a response from the one or more other customers. For example, a response is received from the WSLAN gateways of the one or more other customers that have spectrum sensing technology. The response may contain one or more available white space channels being reported back as being available for use to communicate with the one or more other customers. The response is obtained by applying the same spreading sequence that was previously applied to the first request.

In step 360, method 300 selects a white space channel in accordance with the received one or more responses from the one or more other customers. For example, the method may determine that there are "n" number of white space channels that are available for use at all the desired destinations.

For example, if the customer is intending to use the white space channel to communicate with ten other customers and each one of the gateways serving the ten other customers sends a response, the method may identify which channels are commonly available at all eleven locations, i.e., the source location and the ten destination (other customer) locations. For instance, from among the "n" white space channels there may be only one white space channel that is commonly available at all of the eleven locations. The channel that is available at all of the eleven locations is then selected. The method then proceeds to optional step 370.

In optional step 370, method 300 uses the selected white space channel for communicating with the one or more other customers. For the example above, the method may establish communication between the customer and the other ten customers over the selected white space channel, which is found to be available at all of the eleven locations. Alternatively, in one embodiment, the customer may not want to use the available white space channel for communication with the other customers. In fact, the customer may simply want to reserve the available white space channel for private use within the customer's own WSLAN. In this scenario, the initial negotiation results in an available white space channel that is reserved for use only by the requesting customer. Returning back to step 370, the method then proceeds to step 380 to end processing the current request, or returns to step 310 to continue with identification of a next need for a white space channel.

Figure 4:
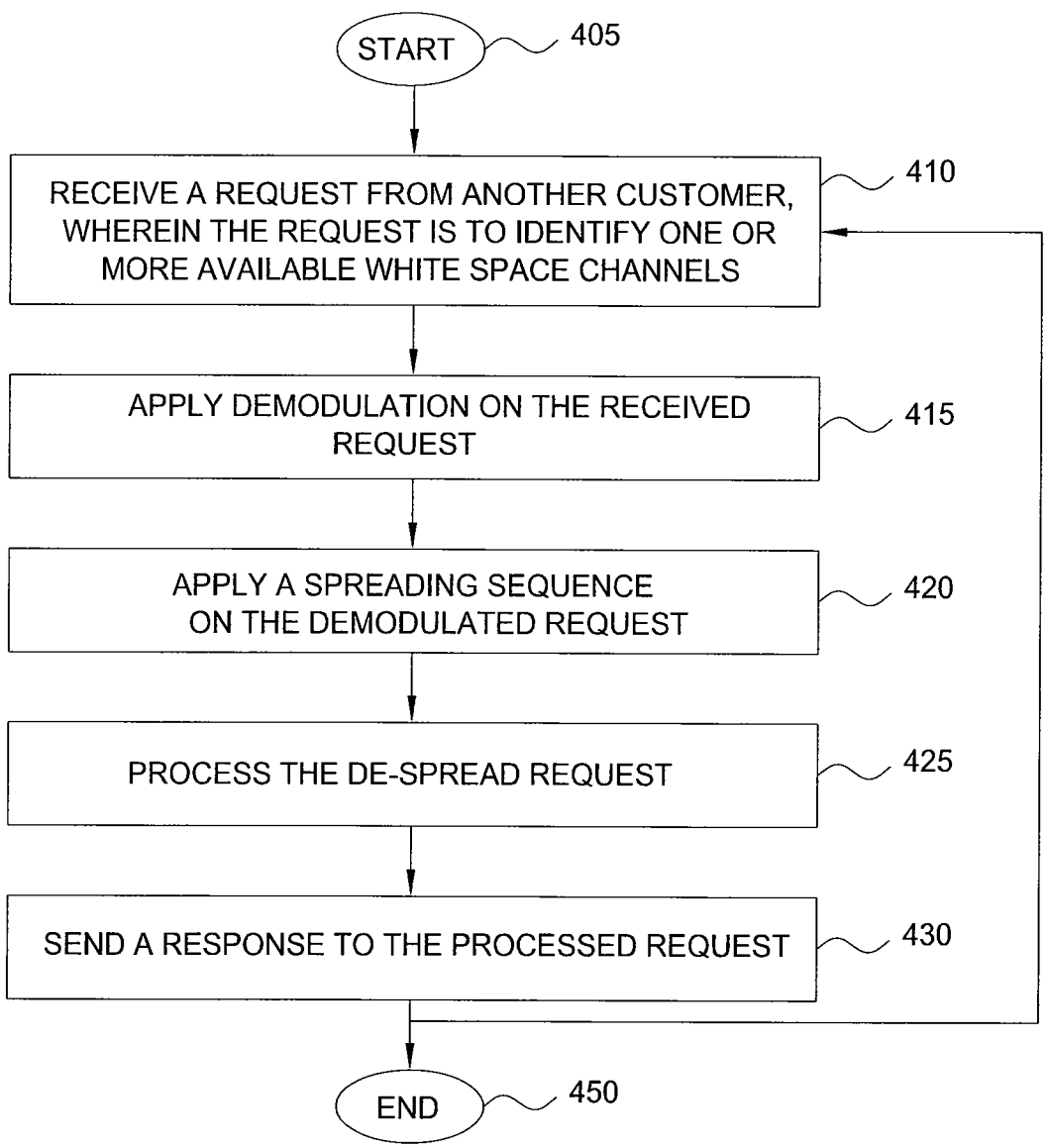
FIG. 4 illustrates a flowchart of a method for receiving an initiation of communication over a white space channel without causing interference.

FIG. 4 illustrates a flowchart of a method 400 for receiving an initiation of communication over a white space channel without causing interference. In one embodiment, the method 400 can be implemented in a network device serving as a gateway for a WSLAN. Method 400 starts in step 405 and proceeds to step 410.

In step 410, method 400 receives a request from another customer, wherein the request is to identify one or more available white space channels. For example, a WSLAN gateway for a customer (e.g., at a receiver location) may receive a request from a WSLAN gateway serving another customer (e.g., at a transmitter location). Using the above example, method 400 at step 410 receives the third request described above.

In step 415, method 400 applies demodulation on the received request. For example, the method applies a demodulation technique and converts the received to a demodulated request.

In step 420, method 400 applies the spreading sequence on the demodulated request. For example, the spreading sequence that is the same spreading sequence that was used in generating the request.

In step 425, method 400 processes the de-spread request. For example, the method processes the request to identify one or more available white space channels. For example, availability of at least one white space channel is determined using a sensing method that is applied to the local location of the receiver that received the initial request.

In step 430, method 400 sends a response to the processed request. For example, the method sends a response (broadly a response pertaining to information indicative of an availability of white space channels) that comprises one or more available white space channels (or no available white space channels if that is the case). For example, the method generates a response pertaining to an availability of white space channels, applies a spreading sequence, applies OFDM and then transmits the resulting waveform wirelessly back to the customer who sent the initial request. The method then proceeds to step 450 to end processing the current request, or returns to step 410 to continue receiving other requests.

The WSLAN gateway serving the customer who initiated the request may then aggregate the responses from the one or more other WSLAN gateways that serve the one or more other customer, to identify a white space channel that is commonly available at all the locations. For example, one of the white space channels may be unused at all the locations. The WSLAN gateway may then select one of the available white space channels and establishes communication over the selected white space channel to communicate with other customers or for private use as discussed above. In this manner, the current method and apparatus enable the WSLAN gateways serving a plurality of customers to cooperatively identify an available white space channel without causing interference. The customers may then benefit by being able to communicate over the white space channel that is available.

It should be noted that although not specifically specified, one or more steps of method 300 or method 400 may include a storing, displaying and/or outputting step as required for a particular application. In other words, any data, records, fields, and/or intermediate results discussed in the method can be stored, displayed and/or outputted to another device as required for a particular application. Furthermore, steps or blocks in FIG. 3 or FIG. 4 that recite a determining operation or involve a decision, do not necessarily require that both branches of the determining operation be practiced. In other words, one of the branches of the determining operation can be deemed as an optional step.

Figure 5:
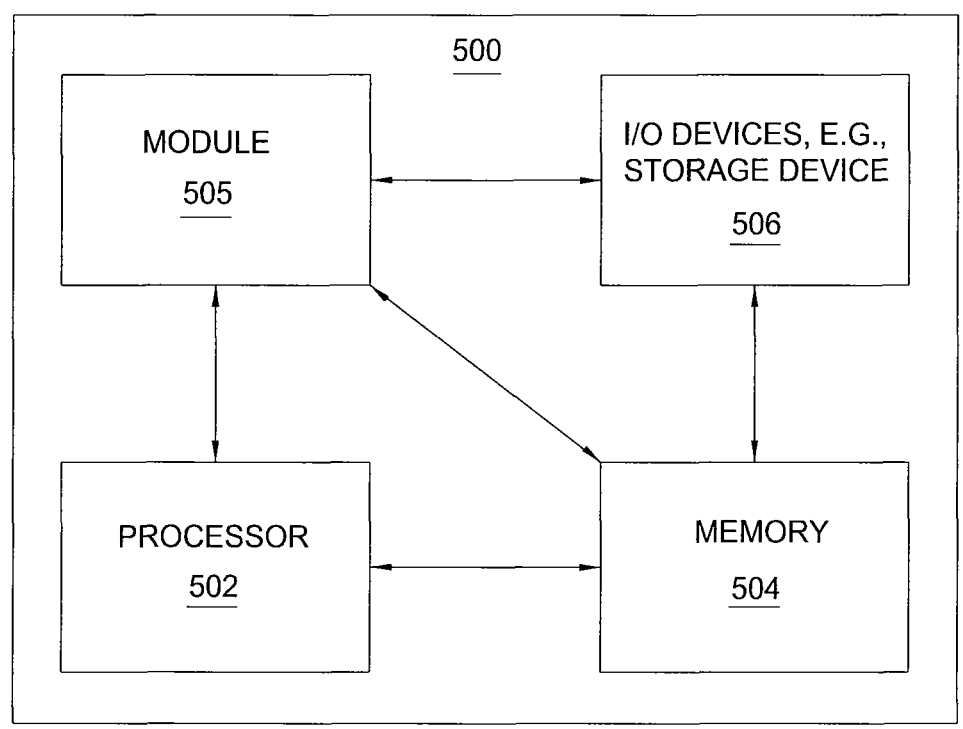
FIG. 5 illustrates a high-level block diagram of a general-purpose computer suitable for use in performing the functions described herein.

FIG. 5 depicts a high-level block diagram of a general-purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for providing communication over a white space channel without causing interference, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents. In one embodiment, the present module or process 505 for providing communication over a white space channel without causing interference can be loaded into memory 504 and executed by processor 502 to implement the functions as discussed above. As such, the present method 505 for providing communication over a white space channel without causing interference (including associated data structures) of the present disclosure can be stored on a computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for generating a first request, comprising:
generating, via a processor, the first request to identify an available white space channel;
applying, via the processor, a spreading sequence to the first request to generate a second request, wherein the second request comprises a fluctuating waveform as compared to a waveform of the first request that is generated by applying the spreading sequence to the first request;
applying, via the processor, a modulation to the second request to generate a third request in a time domain; and
transmitting, via the processor, the third request via a wireless communication to a device of a user.

2. The method of claim 1, further comprising:
receiving a response to the third request from the user; and
selecting a white space channel in accordance with the response from the user.

3. The method of claim 2, further comprising:
using the white space channel that is selected for communicating with the user.

4. The method of claim 2, further comprising:
using the white space channel that is selected for local use in a local area network.

5. The method of claim 2, wherein the applying the spreading sequence is performed by the processor of a gateway device.

6. The method of claim 5, wherein the spreading sequence is performed by the gateway device in processing the response.

7. The method of claim 6, wherein a service provider of a communication network instantiates the spreading sequence in the gateway device.

8. The method of claim 6, wherein the spreading sequence is selected from a registry maintained by a service provider of a communication network.

9. The method of claim 6, wherein the spreading sequence is selected from a registry that is accessible locally by the gateway device.

10. The method of claim 1, wherein the modulation comprises a frequency division multiplexing.

11. The method of claim 10, wherein the frequency division multiplexing comprises an orthogonal frequency division multiplexing.

12. A non-transitory computer-readable storage medium storing a plurality of instructions which, when executed by a processor, cause the processor to perform operations for generating a first request, the operations comprising:
generating the first request to identify an available white space channel;
applying a spreading sequence to the first request to generate a second request, wherein the second request comprises a fluctuating waveform as compared to a waveform of the first request that is generated by applying the spreading sequence to the first request;
applying a modulation to the second request to generate a third request in a time domain; and
transmitting the third request via a wireless communication to a device of a user.

13. The non-transitory computer-readable storage medium of claim 12, further comprising:
receiving a response to the third request from the user; and
selecting a white space channel in accordance with the response from the user.

14. The non-transitory computer-readable storage medium of claim 13, further comprising:
using the white space channel that is selected for communicating with the user.

15. The non-transitory computer-readable storage medium of claim 13, wherein the applying the spreading sequence is performed by the processor of a gateway device.

16. The non-transitory computer-readable storage medium of claim 15, wherein the spreading sequence is performed by the gateway device in processing the response.

17. A method for processing a request, comprising:
receiving, via a processor, the request wirelessly, wherein the request comprises a request for availability of a white space channel;

applying, via the processor, a demodulation on the request to generate a demodulated request;

applying, via the processor, a spreading sequence on the demodulated request to generate a de-spread request, wherein the de-spread request comprises a waveform as compared to a fluctuating waveform of the demodulated request that is generated by applying the spreading sequence to the demodulated request; and processing, via the processor, the de-spread request by determining an availability of a white space channel.

18. The method of claim 17, further comprising:

sending a response to the request, wherein the response comprises information pertaining to the availability of the white space channel.

19. The method of claim 17, wherein the processing comprises applying a sensing method to determine the availability of the white space channel at a local location.

20. The method of claim 17, wherein the applying the spreading sequence is performed by the processor of a gateway device.

* * * * *